No. 770,365. PATENTED SEPT. 20, 1904.
G. HACKER.
BROODER.
APPLICATION FILED MAR. 3, 1904.
NO MODEL. 4 SHEETS—SHEET 1.

Witnesses
Alfred A. Eicks
M. R. Rion

Inventor
George Hacker
by Higdon & Longan & Hopkins Attys

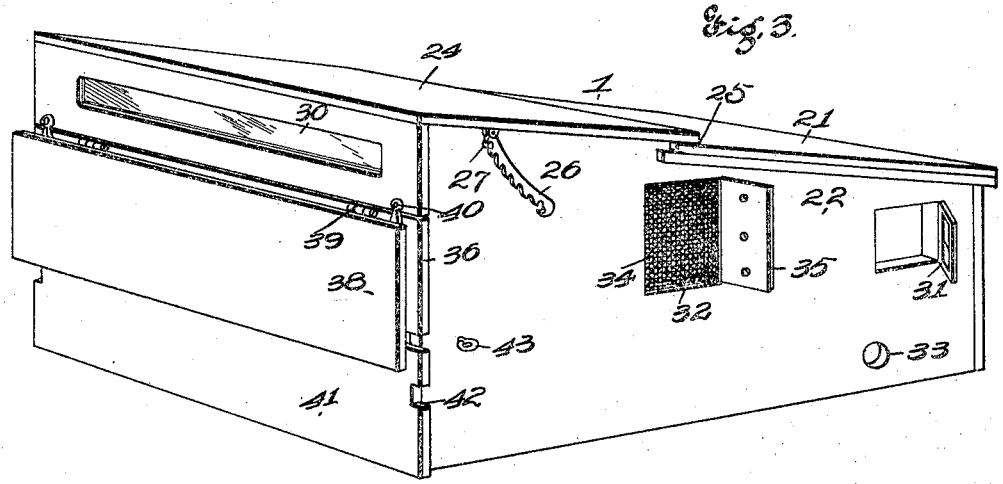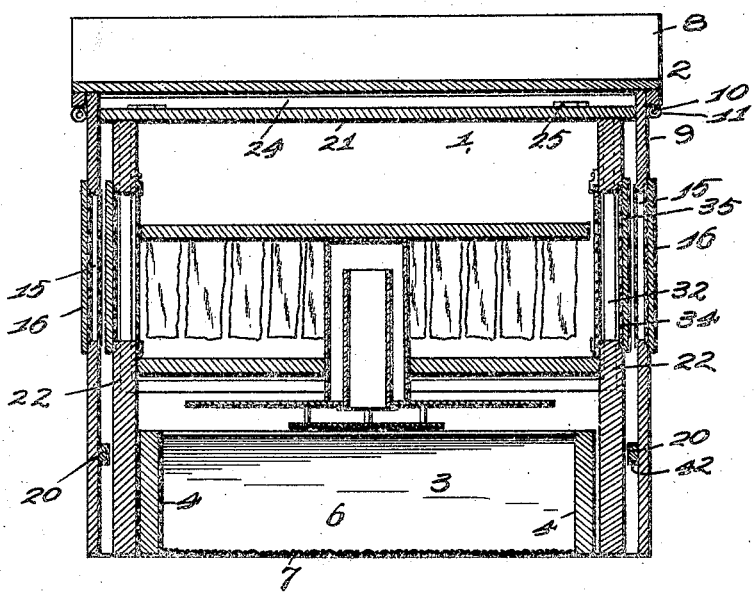

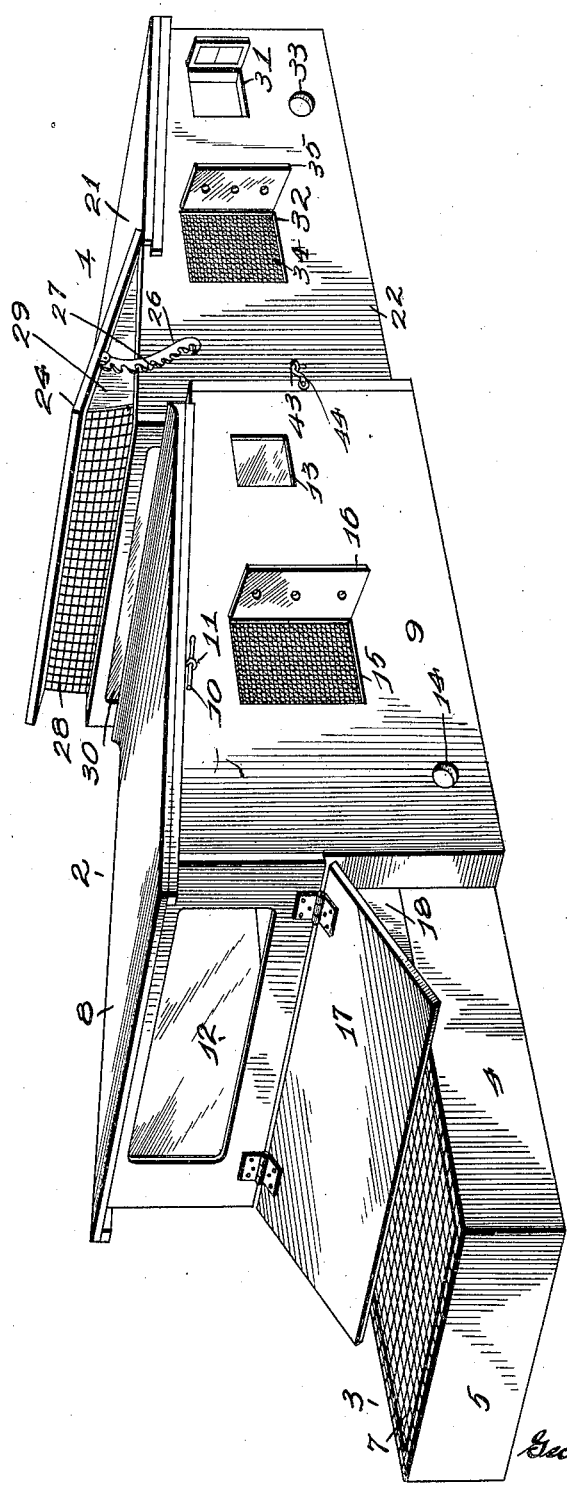

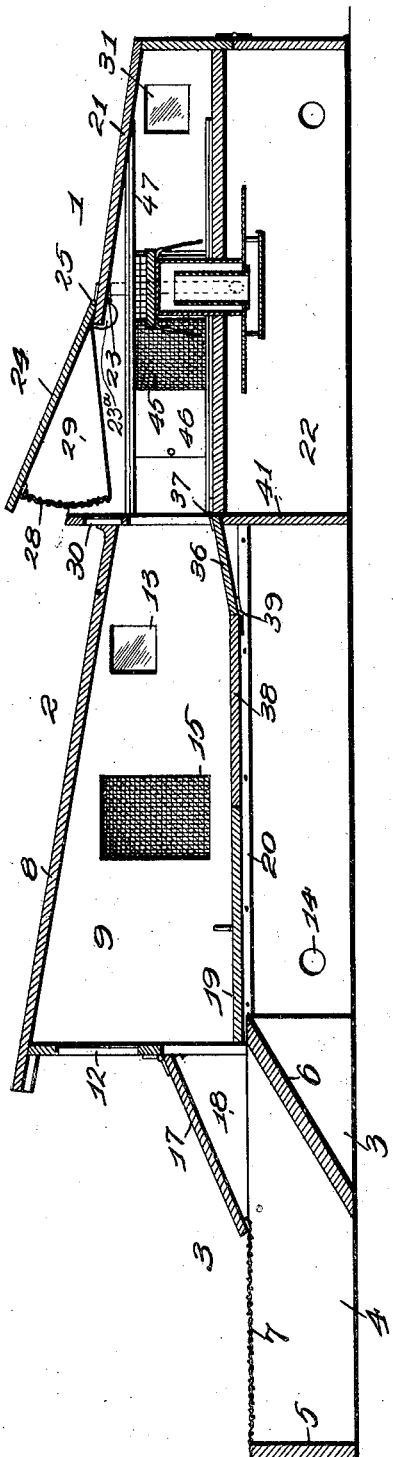

No. 770,365. Patented September 20, 1904.

UNITED STATES PATENT OFFICE.

GEORGE HACKER, OF ST. LOUIS, MISSOURI.

BROODER.

SPECIFICATION forming part of Letters Patent No. 770,365, dated September 20, 1904.

Application filed March 3, 1904. Serial No. 196,445. (No model.)

*To all whom it may concern:*

Be it known that I, GEORGE HACKER, a citizen of the United States, residing at St. Louis, State of Missouri, have invented certain new and useful Improvements in Brooders, of which the following is a specification containing a full, clear, and exact description, reference being had to the accompanying drawings, forming a part hereof.

My invention relates to an improved brooder, and has for its object to provide a brooder comprising a plurality of sections capable of being nested together for purposes of storage or transportation, my brooder possessing further advantages which are hereinafter set forth.

Figure 1:
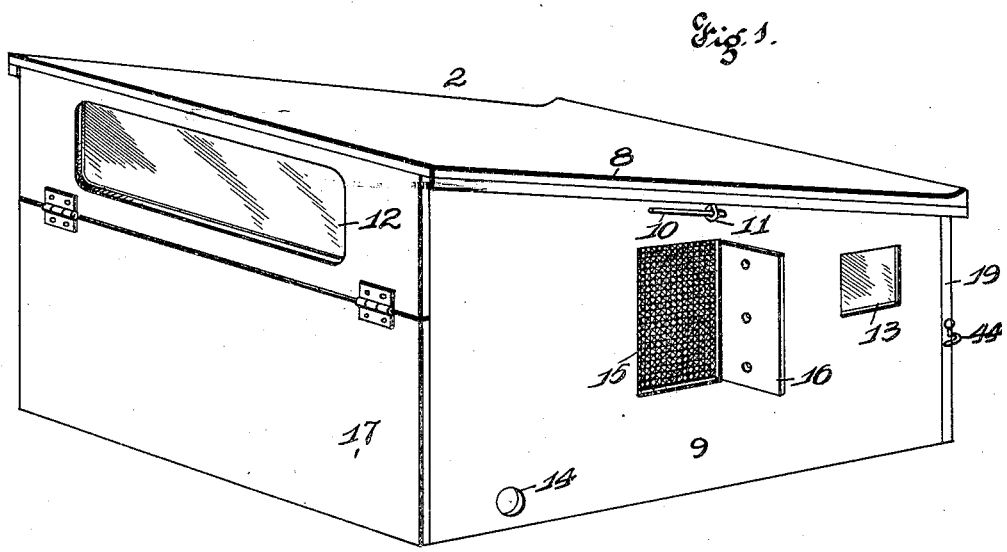
Figure 2:
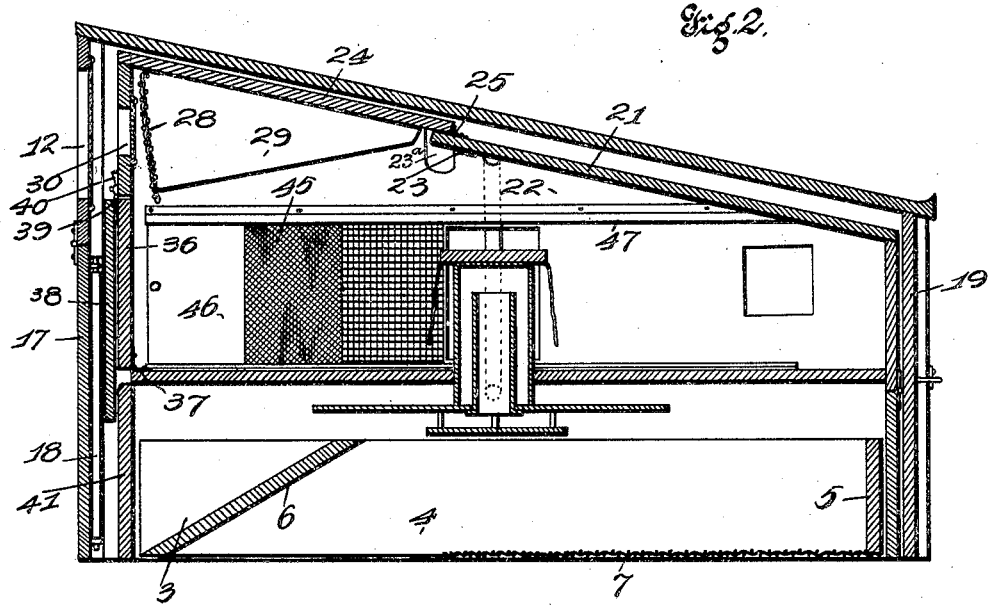

In the drawings, Figure 1 is a perspective view of a brooder embodying my invention, the sections being nested together. Fig. 2 is a transverse vertical view in mid-section of the same. Fig. 3 is a perspective view of the hover-section. Fig. 4 is a transverse vertical view in mid-section of the same. Fig. 5 is a perspective view of a brooder embodying my invention, the sections being extended. Fig. 6 is a longitudinal vertical view in mid-section of the same.

In the form of my invention shown in the drawings there are three sections—*i. e.*, a hover-section 1, a feeding-section 2, and a runway-section 3. The runway-section 3 consists of the side walls 4, the end wall 5, and inclined floor 6 and is provided with a perforate roof 7. Save for the inclined member 6 the runway-section 6 is bottomless and is intended to be set upon the ground or floor of a poultry-shed. As shown in Fig. 2, the runway-section 3 is inverted for purposes of nesting and when so inverted rests within the walls of the hover-section 1, the normal position of the runway-section 3 being shown in Figs. 5 and 6. When the several sections are nested, the feeding-section 2 is outermost, as shown in Fig. 1, this section being provided with the roof 8, which is slidingly and detachably mounted upon the side walls 9 by means of the hooks 10, mounted in said side walls 9, and eyelets 11, attached to the roof 8 and adapted to engage with the hooks 10. The feeding-section 2 is further provided with the front window 12 and side windows 13. The side walls 9 are provided with the ventilating-holes 14 and ventilating-windows 15, the ventilating-windows 15 being provided with sheets of perforate and pervious material and with perforated doors 16.

The front of the feeding-section 2 is provided with the hinged door 17, which may be swung outwardly and forwardly into the position shown in Fig. 6 to form a roof for the runway-section 3, the said door 17 being provided with folding guard-sections 18, which drop into position as the said door is elevated in order to prevent the chicks from escaping above the walls 4 in the runway-section 3, said guard-sections 18 being folded against the inner side of the door 17 when said door 17 is in a position indicated in Figs. 1 and 2.

The rear end of the feeding-section 2 consists of the removable member 19, said member 19 being removable to permit the forward extension of the feeding-section 2 to the position shown in Fig. 6. The feeding-section 2 is provided with the floor-strips 20, and the member 19 is adapted to rest upon the floor-strips 20 to form a portion of the floor of the feeding-section 2, as shown in Fig. 6.

The hover-section 1 is heated by means of devices described and claimed in the companion application hereto and is constructed as follows: It is provided with a two-section roof, the first roof-section 21 being hinged to the side walls 22 at the point indicated by the numeral 23, there being openings 23$^a$ through the side wall to receive the section 21 when it is raised upon the hinges. The second roof-section 24 is hinged upon the first section 21 at the point indicated by the numeral 25. By means of this method of hinging the said roof-sections to the walls 22 and to each other either roof-section may be raised or lowered without disturbing the other. The second roof-section 24 is provided with a ratchet member 26, by means whereof it may be raised to any desired degree, as indicated in Fig. 6, and will there be caught and held by the engagement of the teeth of the ratchet member 26 with the pin 27. A transverse perforated shield 28 prevents the escape of the chicks from the front of the hover-section when the roof-section 24 is thus raised, while the side guards 29 prevent their escape at the sides. The hover-section 1 is provided with the front window 30 and side windows 31 and 32 and ventilating-holes 33. The windows 32 are provided with sheets of perforate and pervious material 34 and perforated shutters 35. The member 36 is hinged to the front of the hover-section 1 at the point indicated by the numeral 37 and the member 38 is hinged to the top of the member 36 at the point indicated by the numeral 39. The member 36 is normally held against the front of the hover-section 1 by means of the buttons 40, the members 36 and 38 being adapted to be drawn outwardly and forwardly to rest upon the floor-strips 20, as shown in Fig. 6. The front of the hover-section 1 is provided with the fixed member 41, its ends being provided with the grooves 42 to receive the floor-strips 20. The sides of the hover-section 1 are provided with the eyes 43, with which the hooks 44, mounted on the sides of the feeding-section 2, are adapted to engage.

My brooder is adapted for use either as an indoor brooder or outdoor brooder. When used as an outdoor brooder, it will be frequently found desirable to use the feeding-section 2 as a cover for the hover-section 1 at night or during a sudden fall in temperature. When so used, the feeding-section 2 provides the hover-section 1 with double walls. The runway-section 3 is intended for use only in fair weather or when the brooder is used indoors or beneath or within a shed.

The use of my brooder greatly economizes space, inasmuch as it may be extended in use to nearly three times its length when nested.

The hover-section 1 is provided with perforate and pervious sheets 34 in its walls, these sheets being preferably supplemented by sheets 45, arranged to be slid in front of the sheets 34, and a door 46 being arranged to slide over the said sheets 34 and 45 when desired to close the opening 32, the door 46 being mounted in the slide 47, as indicated in Fig. 2.

I claim—

1. In a brooder, a hover-section provided with a roof made in two sections, the first section of the roof being hinged to the top of the brooder and the second roof-section being hinged to the top of the first roof-section, and means whereby the second roof-section may be adjusted for purposes of ventilation, substantially as described.

2. In a brooder, the combination of a hover-section, a feeding-section and a runway-section, the said sections being adapted to be nested together, a portion of the front of the feeding-section being hinged to form a roof for the runway-section, substantially as described.

3. In a brooder, the combination of a hover-section, a feeding-section and a runway-section, the said sections being adapted to be nested together, a portion of the front of the feeding-section being hinged to form a roof for the runway-section, and a portion of the front of the brooder-section being extensible to form a floor for the feeding-section, substantially as described.

4. In a brooder, the combination of a hover-section, and a feeding-section, the feeding-section being adapted to be used as a cover for the hover-section, and the rear wall of the feeding-section being adapted to serve as a portion of the floor of the feeding-section, substantially as described.

5. In a brooder: the combination of a hover-section, a feeding-section and a runway-section adapted to be nested together, so that the feeding-section entirely incloses the hover-section and the runway-section; substantially as specified.

6. In a brooder: the combination of a hover-section and a feeding-section adapted to be nested, so that the feeding-section serves as a cover and entirely incloses the hover-section, thus producing double walls all the way around when nested; substantially as specified.

7. In a brooder: a hover-section having a hinged roof-section provided with a depending foraminous shield at its front; and means of adjusting the roof-section for purposes of ventilation through the shield; substantially as specified.

In testimony whereof I have signed my name to this specification in presence of two subscribing witnesses.

GEORGE HACKER.

Witnesses:
ALFRED A. EICKS,
F. CLEMENTINE CRISLER.